(12) United States Patent
Dykstra et al.

(10) Patent No.: US 9,656,317 B1
(45) Date of Patent: May 23, 2017

(54) STAMP, MOLD, QUENCH OF ALUMINUM AND MAGNESIUM SHEET

(71) Applicant: Temper IP, LLC, Rockford, MI (US)

(72) Inventors: William C. Dykstra, Rockford, MI (US); Luke A. Martin, Wyoming, MI (US)

(73) Assignee: TEMPER IP, LLC, Rockford, MI (US)

( * ) Notice: Subject to any disclaimer, the term of this patent is extended or adjusted under 35 U.S.C. 154(b) by 27 days.

(21) Appl. No.: 14/612,703

(22) Filed: Feb. 3, 2015

Related U.S. Application Data

(60) Provisional application No. 62/049,078, filed on Sep. 11, 2014, provisional application No. 61/935,054, filed on Feb. 3, 2014.

(51) Int. Cl.
*B21D 37/16* (2006.01)
*B21J 1/06* (2006.01)
(Continued)

(52) U.S. Cl.
CPC ............... *B21J 1/06* (2013.01); *B21D 37/16* (2013.01); *B21J 5/025* (2013.01); *B21J 13/02* (2013.01);
(Continued)

(58) Field of Classification Search
CPC .... B21J 1/06; B21J 5/025; B21J 13/02; B29C 35/08; B29C 35/00; B21K 7/12; B21D 37/16
(Continued)

(56) References Cited

U.S. PATENT DOCUMENTS

| | | | |
|---|---|---|---|
| 2,317,597 | A | 4/1943 | Ford et al. |
| 2,461,323 | A | 2/1949 | Hille |

(Continued)

FOREIGN PATENT DOCUMENTS

| | | |
|---|---|---|
| JP | 3295188 | 12/1991 |
| JP | 6297049 | 10/1994 |
| KR | 2005070346 | 7/2005 |

OTHER PUBLICATIONS

Singh, Harry, Mass Reduction of Light-Duty Vehicles for Model Years 2017-2025. N.p.: NHTSA, n.d, Published Aug. 2012, ftp://ftp.nhtsa.dot.gov/CAFE/2017-25_Final/811666.pdf.

(Continued)

*Primary Examiner* — David B Jones
(74) *Attorney, Agent, or Firm* — Gardner, Linn, Burkhart & Flory, LLP

(57) ABSTRACT

A method of forming and quenching a product via electrically heating includes providing tools that have been electrically heated, providing a die forming shell for supporting a component and for defining a final shape of a formed product formed from the component, and providing a support structure for supporting the die forming shell during the heating of the component or tools. Two portions of the die forming shell are joined together so that an inner surface of the two portions cooperate to form a cavity that defines the shape of the formed product. The component is formed into the formed product, whereby the component is (a) heated before the formed product is formed and/or (b) heated while the formed product is formed. The formed product is quenched via conductive quenching through the die forming shell by at least one of water and a gas.

31 Claims, 10 Drawing Sheets

(51) Int. Cl.
*B21J 5/02* (2006.01)
*B21J 13/02* (2006.01)
*B21K 7/12* (2006.01)
*B29C 35/00* (2006.01)
*B29C 35/08* (2006.01)
*B29L 31/00* (2006.01)

(52) U.S. Cl.
CPC ............... *B21K 7/12* (2013.01); *B29C 35/00* (2013.01); *B29C 35/08* (2013.01); *B29L 2031/00* (2013.01)

(58) Field of Classification Search
USPC ...................................................... 72/342.4
See application file for complete search history.

(56) References Cited

U.S. PATENT DOCUMENTS

| | | | |
|---|---|---|---|
| 2,755,689 A | 7/1956 | Sundback | |
| 2,852,649 A | 9/1958 | Limpel | |
| 3,126,937 A | 3/1964 | Brower et al. | |
| 3,250,104 A | 5/1966 | Fischer | |
| 3,605,477 A | 9/1971 | Carlson | |
| 3,679,807 A | 7/1972 | Carcey | |
| 3,972,744 A | 8/1976 | Cantrell | |
| 4,437,326 A | 3/1984 | Carlson | |
| 4,496,131 A | 1/1985 | Yang | |
| 4,569,218 A | 2/1986 | Baker et al. | |
| 4,659,056 A | 4/1987 | Michaud-Soret | |
| 5,040,399 A | 8/1991 | Knapper et al. | |
| 5,410,132 A | 4/1995 | Gregg et al. | |
| 5,530,227 A | 6/1996 | Matsen et al. | |
| 5,645,744 A | 7/1997 | Matsen et al. | |
| 5,682,783 A | 11/1997 | Creamer et al. | |
| 5,683,608 A | 11/1997 | Matsen | |
| 5,699,693 A | 12/1997 | Nogami et al. | |
| 5,749,256 A | 5/1998 | Bodnar | |
| 6,322,645 B1 | 11/2001 | Dykstra et al. | |
| 6,576,877 B2 | 6/2003 | Dabelstein et al. | |
| 6,613,164 B2 | 9/2003 | Dykstra et al. | |
| 6,694,597 B2 | 2/2004 | Wang et al. | |
| 6,810,709 B2 | 11/2004 | Hammar et al. | |
| 6,921,444 B2 | 7/2005 | Joaquin et al. | |
| 7,003,996 B2 | 2/2006 | Dykstra et al. | |
| 7,024,897 B2 | 4/2006 | Pfaffmann et al. | |
| 7,159,437 B2 | 1/2007 | Schroth et al. | |
| 7,269,986 B2 | 9/2007 | Pfaffmann et al. | |
| 7,305,860 B2 | 12/2007 | Yang et al. | |
| 7,645,104 B2 | 1/2010 | Denham et al. | |
| 7,777,600 B2 | 8/2010 | Brooks | |
| 8,336,359 B2 | 12/2012 | Werz | |
| 8,479,552 B1* | 7/2013 | Dykstra | B21D 37/16 72/342.4 |
| 2003/0168445 A1* | 9/2003 | Haimer | H05B 6/14 219/643 |
| 2005/0281632 A1 | 12/2005 | Donhauser | |
| 2006/0107716 A1 | 5/2006 | Dykstra | |
| 2010/0083480 A1 | 4/2010 | Carter | |
| 2010/0083481 A1 | 4/2010 | Luo et al. | |
| 2013/0312474 A1 | 11/2013 | Dykstra | |

OTHER PUBLICATIONS

Billur, Eren, "Warm Forming of Alloys in the Auto Industry: An Alternative to Struggling with Straight Stamping of Aluminum Alloys has Emerged," Stamping Journal, Published Jun. 28, 2013, http://www.thefabricator.com/article/stamping/warm-forming-of-alloys-in-the-auto-industry.

Cheah, Lynette, "Factor of Two: Halving the Fuel Consumption of New U.S. Automobiles by 2035" Laboratory for Energy and Environment, MIT, 2007. Published Oct. 2007, http://mitei.mit.edu/system/files/2007-04-rp.pdf.

Greenhouse Gas Emissions from a Typical Passenger Vehicle. N.p.: U. S. Environmental Protection Agency, Published 2011, http://www.epa.gov/oms/climate/documents/420f11041.pdf, Accessed Apr. 13, 2013.

Matsen, Marc R, "Induction Consolidation/Molding of Thermoplastic Composites Using Smart Susceptors," US DoE Office of Scientific and Technical Information, Published Jun. 6, 2014.

* cited by examiner

| | CAPABILITIES | | | | DEFECTS | | | |
|---|---|---|---|---|---|---|---|---|
| PROCESS | Stamping | Molded-In Features | In-Die Tempering | Necking | Dispersion | Grain Boundary | Porosity |
| Warm Forming | POSSIBLE | no | no | possible | NO | NO | NO |
| Casting | no | POSSIBLE | no | NO | possible | possible | possible |
| Thixotropic Forming | no | POSSIBLE | no | NO | possible | possible | possible |
| SMQ Processing | POSSIBLE | POSSIBLE | POSSIBLE | possible | NO | NO | NO |

FIG. 1A

STAMP, MOLD, QUENCH OF ALUMINUM AND MAGNESIUM SHEET

CROSS REFERENCE TO RELATED APPLICATIONS

The present application claims the filing benefits of U.S. provisional applications, Ser. No. 62/049,078, filed Sep. 11, 2014, and Ser. No. 61/935,054, filed Feb. 3, 2014, which are hereby incorporated herein by reference in their entireties.

FIELD OF THE INVENTION

The present invention is directed to a method of manufacturing aluminum and magnesium sheet components, particularly for use in automotive manufacturing.

BACKGROUND OF THE INVENTION

The automotive industry is in a tight spot. Customer demand and the Corporate Average Fuel Economy (CAFE) standards for 2025 are driving a focus on generating an average new vehicle fuel economy of more than 60 miles per gallon for cars and 43 miles per gallon for trucks by 2025. In order to reach this goal, vehicle lightweighting has become a major focus area, with the highest immediate benefits coming from increased use of lightweight materials. A weight reduction of 10 percent corresponds to a 6-7 percent increase in fuel economy. Aluminum is approximately ⅓ lighter than steel and, as such, the switch from steels to lightweight, high strength aluminum alloys is very important. For example, the Honda Accord, the second-bestselling car for its segment in the U.S. (in 2010), is almost 50 percent steel. For example, switching body panels and enclosures to aluminum will reduce the weight by approximately 20 percent, increasing the fuel economy by 12-14 percent.

The problem is that automobile manufacturers are already doing everything they can to reduce vehicle weight. Automotive components are being designed down to the gram, but they are still often too heavy. As a result, manufacturers are forcing aluminum into vehicles despite insufficient manufacturing processes.

In the past, many automotive companies disregarded the benefits of aluminum manufacturing technologies that were incapable of processing parts economically and capturing the full capabilities of the materials. However, customer demand and CAFE standards are forcing aluminum into automotive vehicle designs, which will be costly unless new manufacturing processes are developed. Common manufacturing processes for aluminum and magnesium alloys are warm forming, casting, or thixotropic forming, followed by separate tempering operations.

Warm forming is primarily an aluminum sheet metal process that uses a heated die and blank to enhance formability. While the process is capable of producing typical stamped automotive geometries, the yield strength is too low for many automotive applications.

Casting processes are well known and capable of producing molded parts with stiffening features; however, castable alloys are typically undesirable because of their brittleness and microscopic defects. Furthermore, castings are not suited for large, thin components, such as aluminum sheets, that are common in many automotive applications.

Thixotropic forming is a process that is capable of producing thin, complex geometry, particularly for consumer products. The process, however, has aspect ratio limitations and is prone to microscopic flaws like dispersion issues and grain boundary problems, so there are not many applications for aluminum alloys. Like warm forming, thixotropic forming is not used in many automotive applications because of low yield strength.

SUMMARY OF THE INVENTION

The present invention is a method of forming and quenching a formed product by heating a blank in a stamp, mold and quench (SMQ) process for lightweight metals. The process is capable of maintaining temperatures and pressures needed to form a part with an integrated quenching system to temper the part to desired material characteristics, such as an initial wrought temper condition that can be further treated to a final, or T6, temper condition. The process uses a forming tool to perform the process. The process includes providing the tool having a die forming shell for supporting the blank. The die forming shell has two portions that cooperate to form a cavity that defines a final shape of the formed product. The die forming shell also includes a metallic material. A heat source, such as an induction heating system, heats the blank and at least partially heats the tool surface, which may further heat the blank by conduction. A support structure supports the die forming shell during the SMQ process. Two portions of the die forming shell join and at least partially form the blank (that may be preheated prior to being placed in the die cavity) at traditional warm forming temperatures. The part and die temperatures are then increased by heating, such as induction heating, and stamping pressure is increased by applying additional pressure, such as hydraulic pressure, to the die halves to from the blank into the final shape of the formed product. Finally, the formed product is conductively quenched through the die forming shell by at least one of water and a gas, such as air.

The process of the present invention yields many benefits. The combination of an efficient heating supply and lower thermal mass has significant energy savings when compared to a typical forming process. Furthermore, lower emissions of greenhouse gases are an important environmental benefit resulting from the weight reduction provided by the SMQ process. The process could yield a measurable reduction in $CO_2$ emissions annually per vehicle. In addition, aluminum's lower mass may improve fuel economy, acceleration, stopping distance, and cornering ability. The process is applicable to more than just aluminum, such as magnesium alloys as well.

These and other objects, advantages, purposes and features of the present invention will become more apparent upon review of the following specification in conjunction with the drawings.

DESCRIPTION OF THE PREFERRED EMBODIMENTS

FIG. 1A is a table generally describing the process capabilities and possible defects for aluminum and magnesium forming processes;

DESCRIPTION OF THE PREFERRED EMBODIMENTS

Figure 1:
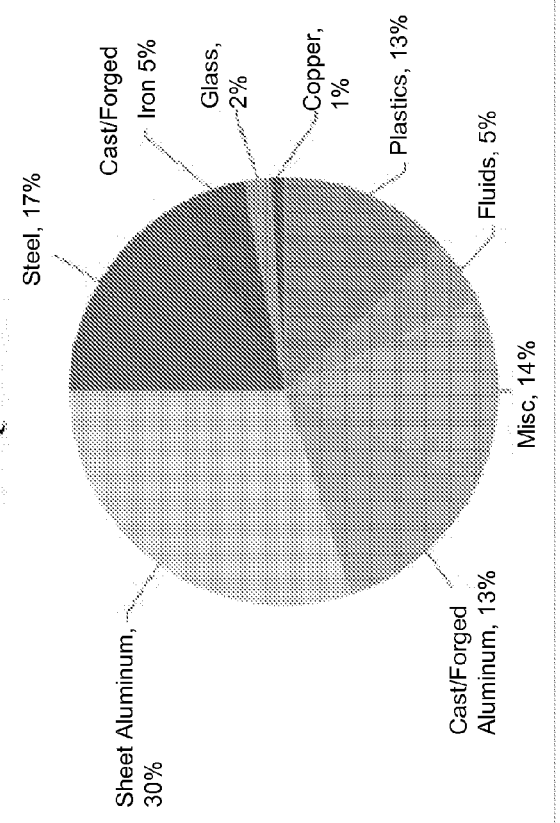
FIG. 1 are graphs comparing material distributions for a 2011 Honda Accord manufactured with current technologies with material distributions of a vehicle manufactured with the SMQ process of the present invention.
Figure 1:
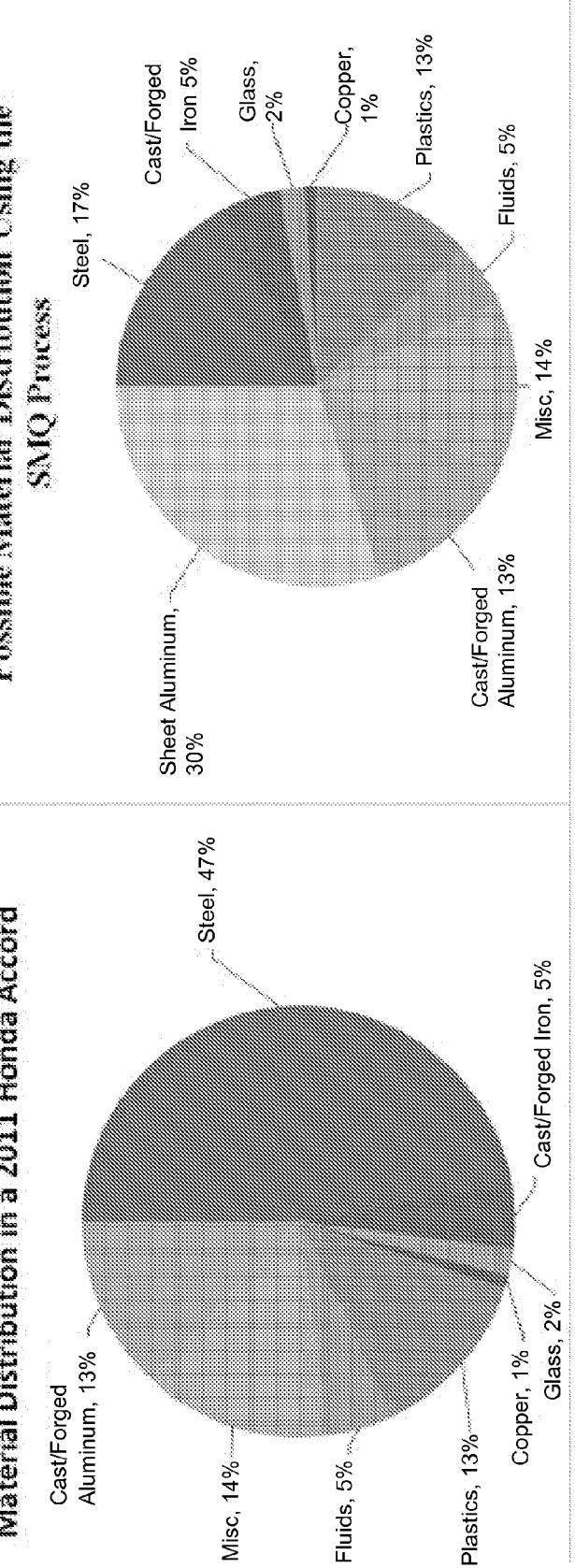
Figure 4:
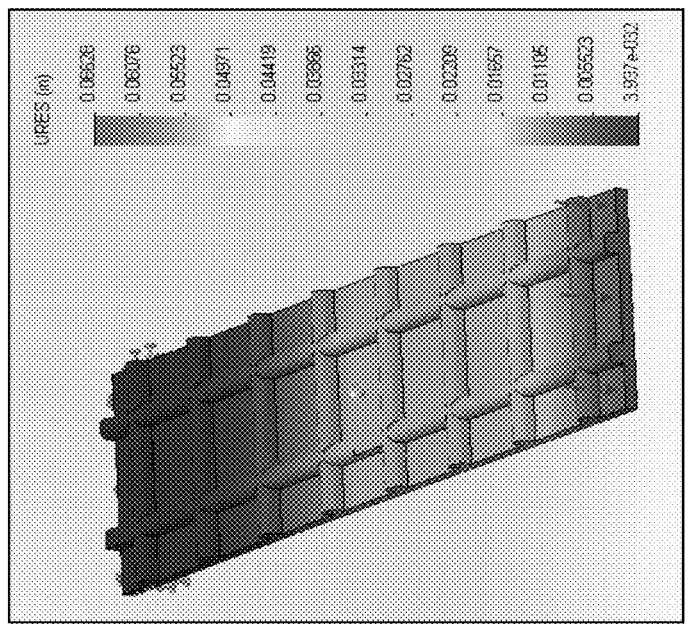
FIG. 4 is a perspective view of an initial FEA model of a stiffness feature made by the process of the present invention.
Figure 3:
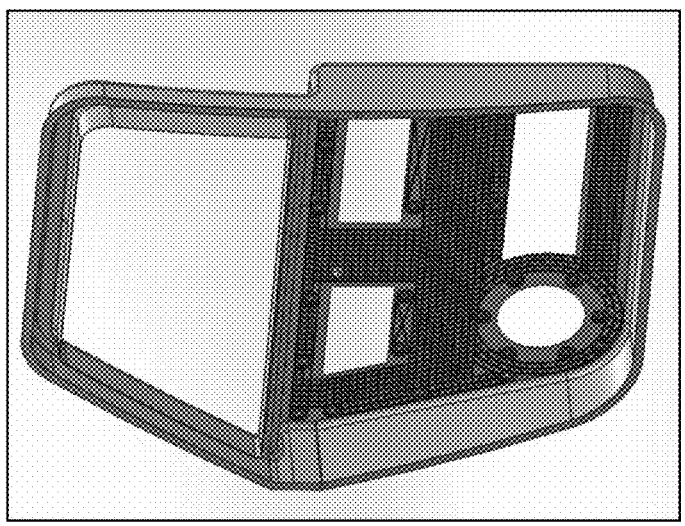
FIG. 3 is a perspective view of a conceptual inner door skin model for an automobile with molded stiffening features as formed by the process of the present invention.
Figure 2:
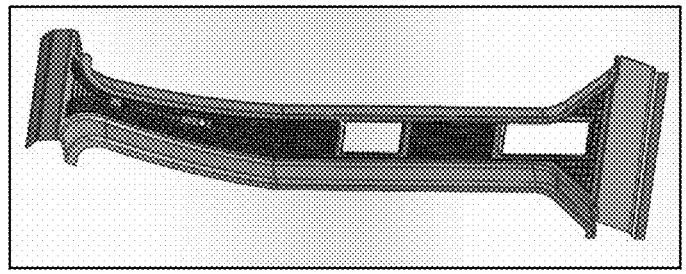
FIG. 2 is a perspective view of a B-pillar model for a general automobile with stiffening features as formed by the process of the present invention.

The present invention is a stamp, mold, and quench (SMQ) process for manufacturing lightweight metal components, particularly from aluminum. The process is capable of producing complex geometry, multi-thickness components. The process increases strength and stiffness for a variety of components, particularly automotive components, including B pillars for improved side impact, and door skins for advanced lightweighting. Complex geometry, such as stiffening features, increase bending stiffness of the components, for example, for B pillars, door, and blanks (FIGS. 2,3, and 4, respectively). FIG. 1 shows that the Honda Accord, the second-bestselling car for its segment in the U.S. (in 2010), is almost 50 percent steel. For example, switching body panels and enclosures to aluminum may reduce the weight by approximately 20 percent, increasing the fuel economy by about 12-14 percent.

Figure 7:
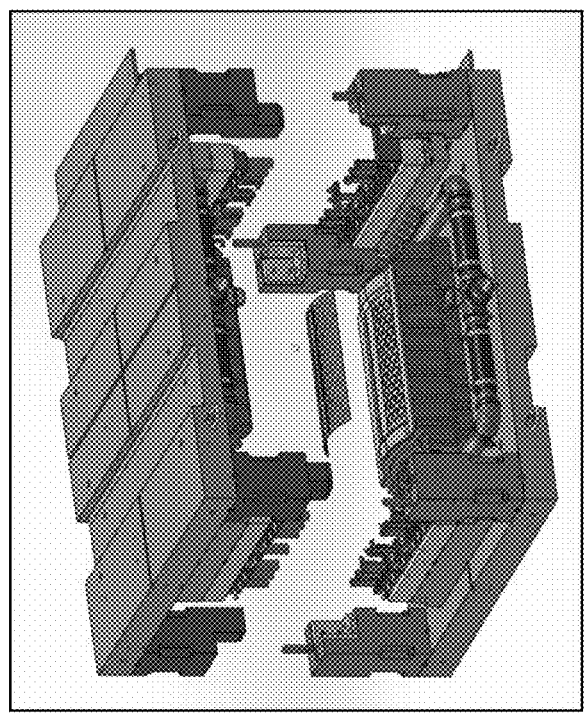
FIG. 7 is a perspective view of a simplified SMQ tool to perform the process of the present invention.
Figure 10:
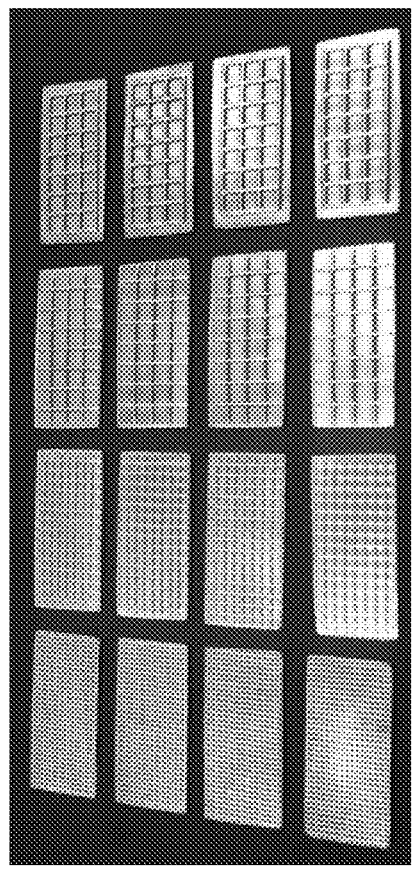
FIG. 10 is a top view of several molded coupons AZ31B MG formed by the process of the present invention.

The process of the present invention uses a tool structure wherein a die forming shell is supported by separated support ribs of a support structure (see FIG. 7) for stamping, molding or forming, and quenching. The process uses an induction heating system to heat a blank, which is stamped, formed, and quenched into a formed product. The blank may be at least partially preheated, and heated in the die forming shell quickly and precisely by heating the blank and at least a portion of the die forming shell tool surface. Heating includes at least one stage. Stamping includes applying a stamping pressure to the heated blank, and forming includes applying further heat and forming pressure to the heated blank. Rapidly quenching at least one portion of the tool die forming shell and the support structure conductively quenches the formed product to achieve the desired material characteristics, such as a TO or wrought temper condition that can be fully heat treated to a T6 temper condition.

In the illustrated embodiment, the process includes providing the tool and the blank for stamping, forming, heating, and quenching the blank into the formed product. In the illustrated embodiment, the blank comprises a metallic material made of common shapes and thicknesses, although the blank may be made of sheet stock. The blank may be made of aluminum, magnesium, steel, rolled homogeneous armor (RHA), high hard (Hi-Hard) armor, or the like. In the illustrated embodiment, heating the blank and die forming shell is accomplished by using at least one induction coil. The process further includes providing the die forming shell with the support structure for supporting the die forming shell during heating of the blank and tool, stamping, forming, and quenching of the formed product. Thus, the die forming shell defines a final shape of the formed product.

Specifically, the die forming shell includes two portions that are generally opposing. The two portions of the die forming shell substantially join, so that an inner surface of the two portions cooperate to form a cavity that defines the final shape of the formed product. It will be appreciated that the cavity may have many shapes depending on the desired final shape of the product. Therefore, the blank, which may be preheated as described below, is positioned and closed within the tool and die forming shell. In the illustrated embodiment, positioning the blank into the die forming shell is performed with a robotic arm. However, it will be appreciated that other tools may be used to position the blank in the die forming shell, such as for example, a crane or the like. In the illustrated embodiment, the blank is a plastic or metallic material. Specifically, the blank may be a plastic material including comprises one of (i) a thermoset material and (ii) a thermoplastic material; or the blank is metallic, including one of (i) aluminum, (ii) magnesium, (iii) titanium, and (iv) steel. Optionally, the blank may be a tubular member that has been at least one of gas formed and preheated, and the blank tubular member may be preheated, gas formed, and quenched tempered.

Figure 5:
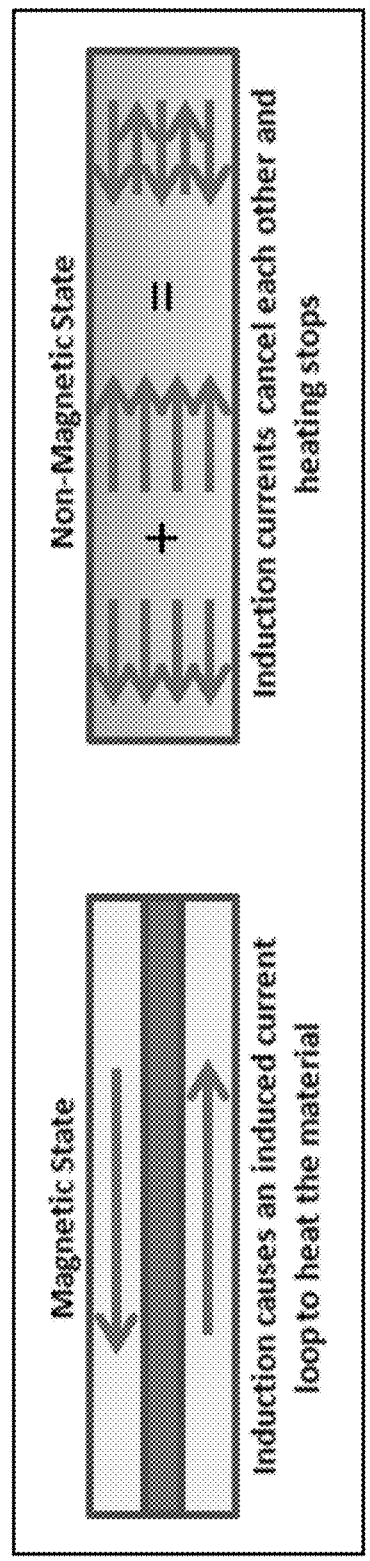
FIG. 5 is a schematic of induction current distributions of the present invention in magnetic and non-magnetic states.

Furthermore, the process of the present invention may use ferromagnetic properties of metallic materials that change from a magnetic to a non-magnetic state at a given temperature, or a Curie point, of the material. The magnetic field from the induction heating system may couple into a ferromagnetic tool, such as the inner surface of the die forming shell or the support structure, and causes the ferromagnetic tool to heat until it reaches the Curie point. The ferromagnetic tool decouples from the magnetic field at the Curie point and the ferromagnetic tool stops heating. Once the material temperature falls below the Curie point, the ferromagnetic tool recouples with the magnetic field and heats again (FIG. 5). Therefore, the process uses the inner surface of the ferromagnetic tool, which has a very low thermal mass, to precisely control the temperature of the die forming shell. For example, the ferromagnetic tool surface may be heated while other portions of the tool remain near room temperature. Furthermore, the process subjects the blank to heat via conduction from the heated die forming shell or support structure. Specifically, the induction system may heat the tool or support structure, which conductively transfers heat to the die forming shell, which heats the blank.

The induction heating system produces the magnetic field with at least one of an induction heating power supply, a separate magnetic field producing source, and a magnetic field that is produced by providing electrical current through a conductor. In one embodiment, the process includes preheating the blank before the blank is placed into the die cavity.

Optionally, the blank may be heated by conduction from the forming tool to the blank, or via other suitable means, such as via electrical resistance heating, or burning of fossil fuels, or the like. Heating the blank increases the amount of elongation the material can undergo before necking, therefore, the blank can be stamped and formed into more complex geometries than what are possible at lower temperatures, such as room temperature.

Furthermore, the process of the present invention may use a magnetic field to affect formability of the blank. The magnetic field may include an AC magnetic field or a DC magnetic field. Optionally, the DC magnetic field may be turned on and off to provide a pulsing or varying magnetic field (such as a DC magnetic field having a frequency up to approximately 1000 Hz). The AC magnetic field operates at a frequency up to approximately 500 KHz. Specifically, the magnetic field is generally between approximately 0.001 Tesla and 20 Tesla, or approximately 10 gauss and 20,000 gauss. Preferably, the magnetic field operates in approximately between 0.25 Tesla and 10 Tesla range, or approximately between 250 gauss and 10,000 gauss. The magnetic field interacts with atoms of the blank, so the atoms shift, which allows for further forming capabilities.

Optionally, the electrical heating of the die forming shell may comprise resistance heating. Optionally, the electrical heating may combine resistance heating and induction heating. For example, at least one induction heating coil may be used to partially heat the blank and one portion of the die forming shell, and one of the joining portions is heated by electrical resistance heating. Therefore, the heated blank is closed and heated within the tool and die forming shell by electrical heating. Optionally, the heating may be provided by direct contact with burning fossil fuels.

The process includes stamping and forming the blank into the formed product, whereby the blank is at least one of (a) preheated, as described above, (b) heated in the die forming shell prior to stamping and forming, and (c) heated during forming. In the illustrated embodiment, forming the blank includes heating at least a portion of the blank with induction heating, such as the induction heating coil, to a temperature above the solution heat treat temperature of the formed product, but below the solidus, or melting, temperature. Within this forming temperature range, the yield stress of the blank is reduced to approximately 7 percent to 10 percent of its room temperature value.

The support structure is integrated with the die forming shell. In the illustrated embodiment, the support structure is made from at least one of ceramic materials and metallic materials. Furthermore, the support structure includes segmented sections or plates that are separated by air or electrically insulating materials such that each segmented section is electrically insulated from the other segmented sections.

Figure 6:
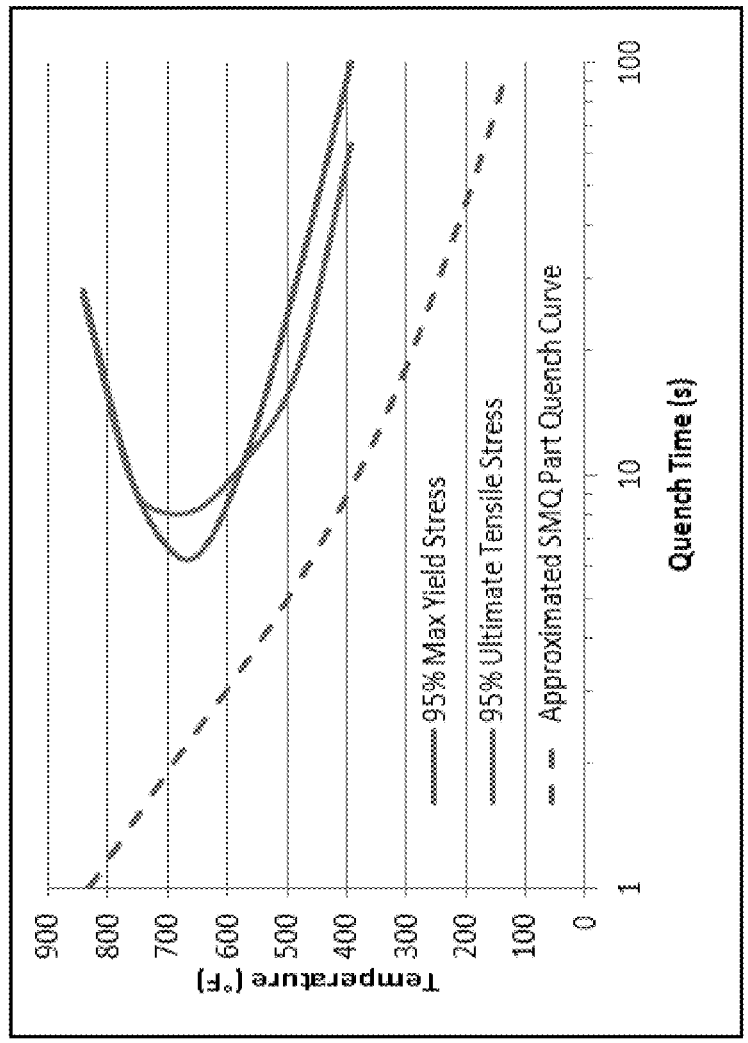
FIG. 6 is a graph of a quench curve for 6061 aluminum material, using the tools according to the present invention.
Figure 8:
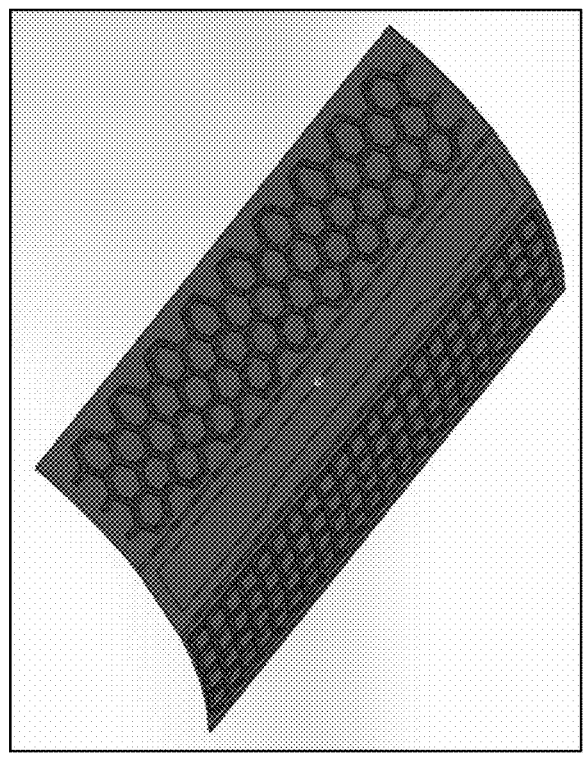
FIG. 8 is a perspective view of a proposed demonstration part model formed by the process of the present invention, showing two molded stiffening patterns with an outline of tensile test sample on a stamped geometry.

The die forming shell surface is supported by the rib structure. The rib structure supports loads from stamping, forming, and quenching while also allowing direct access to an underside of the forming surface. During quenching, a fluid, such as at least one of water and a gas, flows through the rib structure to the forming surface to rapidly cool the formed product before the stamping pressure and forming pressure is removed, which reduces the risk of part distortion. Therefore, at least one of the die forming shell surface and the rib structure forms a fluid quenching system that is integrated with the die forming shell. The estimated cooling rate and quench curves for 6061 aluminum are shown in FIG. 6. The two portions of the die forming shell are separated and the robotic arm, or the like, can remove the formed product.

Figure 9:
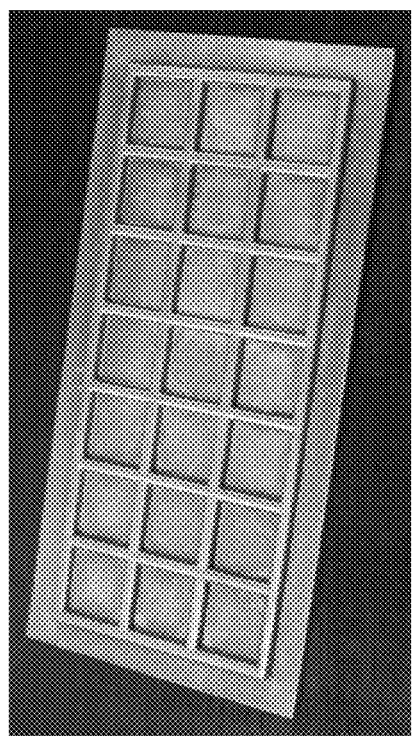
FIG. 9 is a top view of a molded coupon of 6061 aluminum material formed according to the present invention, showing about 27 percent material displacement to form stiffening ribs.
Figure 11:
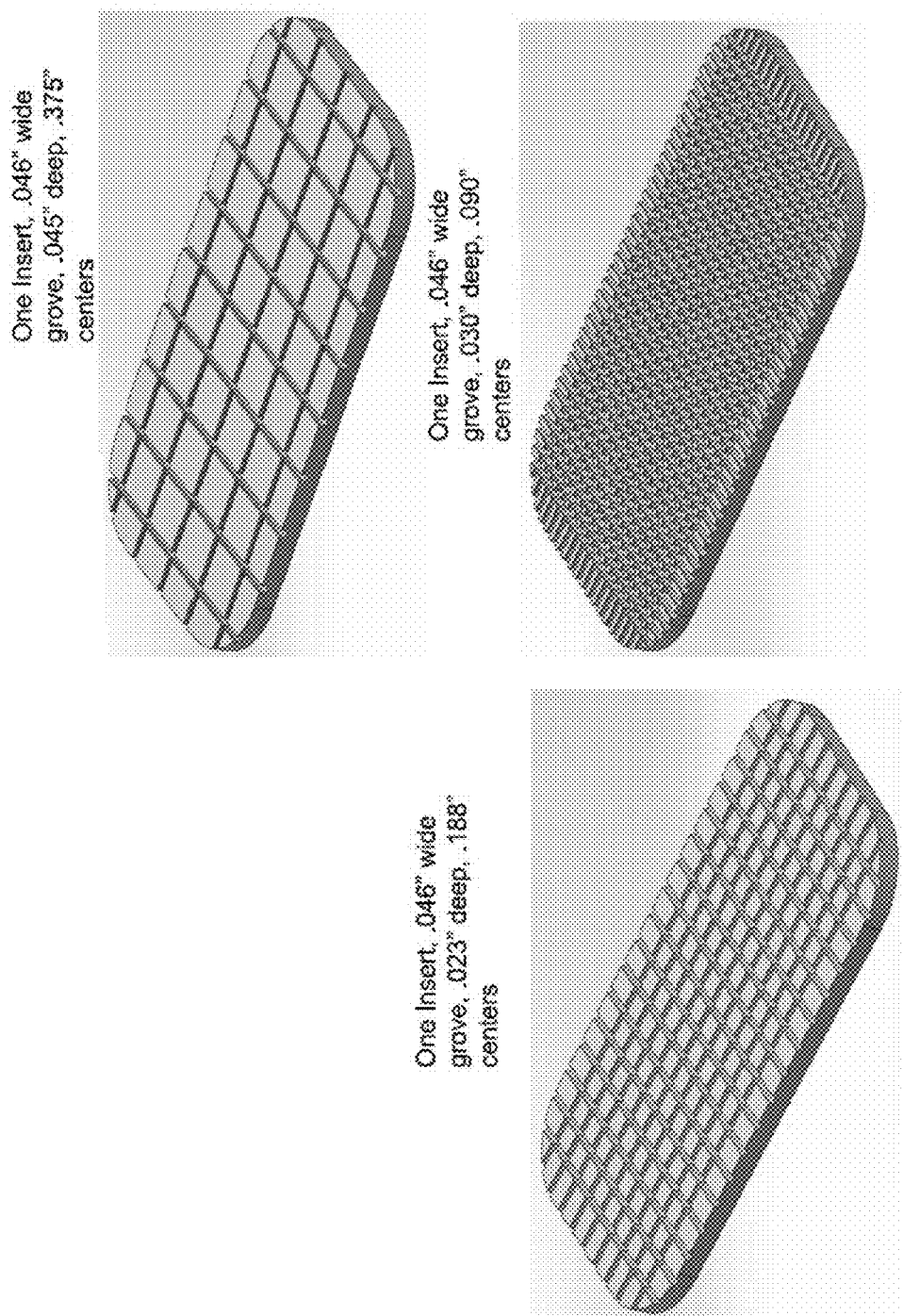
FIG. 11 is a perspective view of several die forming shells having different stiffening features for use in the SMQ tool.
Figures 12, 12A:
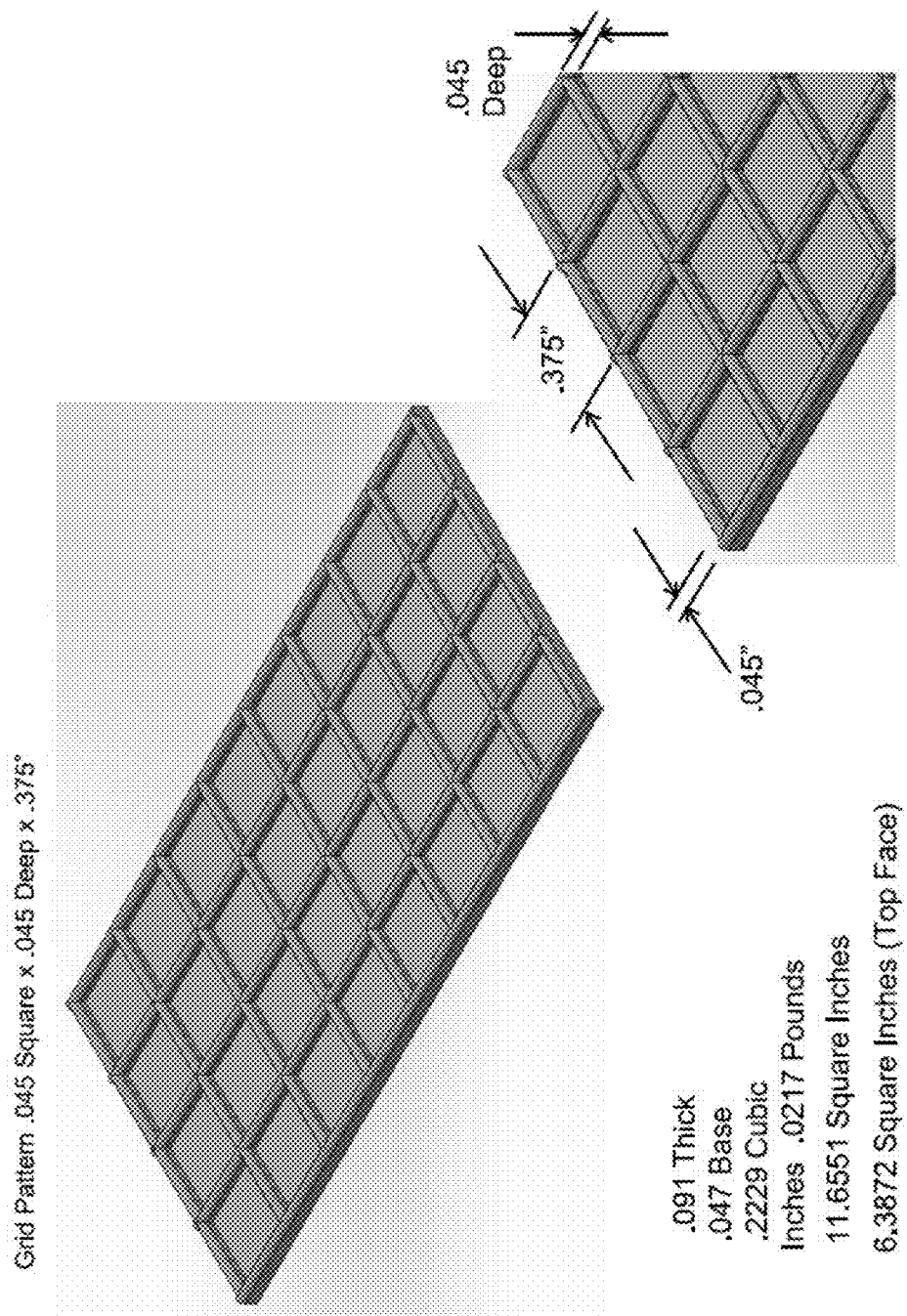
FIG. 12 is a perspective view of a formed product with stiffening features formed with the SMQ tool.
FIG. 12A is an enlarged perspective view of a portion of the formed product with stiffening features of FIG. 12.
Figure 13:
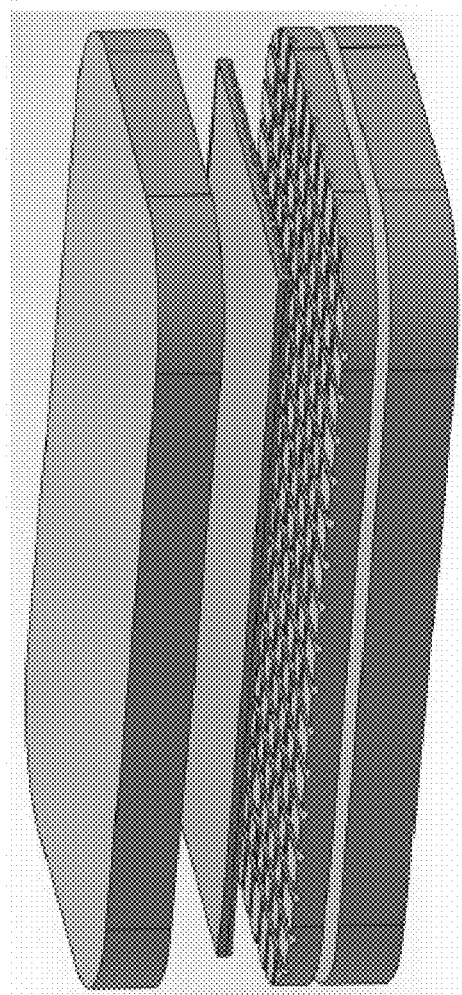
FIG. 13 is a perspective view of die forming shell with the formed product in a cavity, in accordance with the present invention.

During stamping, the die forming shell applies the stamping pressure to the heated blank. The stamping pressure stamps the blank into a rough shape. Further heating of the blank increases formability of the blank, and increasing the stamping pressure to the forming pressure that causes the blank to shear and flow into stiffening features, ribs, attachment points, etc., as determined by the cavity of the die forming shell, thus becoming the formed product having the final shape. Thus, the formed product may be multi-thickness and have integrated stiffening and attachment features. The forming pressure for 6061 aluminum, for example, is approximately 500 psi and 20,000 psi for 6061 aluminum, but preferably approximately between 3,500 psi and 5,000 psi. Because the tool precisely controls the formed products temperature below the solidus temperature of the material during stamping and forming, the formed product does not liquefy or become thixotropic, thus avoiding porosity, dispersion, and void problems. Similarly, the formed product can be solution heat treated by further quenching the formed product to a desired temper condition from above the solution heat treat temperature. FIGS. 8-13 show examples of stamped and formed aluminum coupons with stiffening features. The molded pattern shown in FIG. 9 provides a significant increase in bending stiffness.

For example, the process quenches the formed product rapidly so the cooling rate to avoid the nose of the cooling curve (FIG. 6) and bring the formed product to a wrought temper condition. Thus, the formed product may be subsequently heat treated from the wrought temper condition to the T6 temper condition. The T6 temper condition and hardness level in formed products of 6061 aluminum are not possible through conventional processes, such as warm forming or casting.

The formed product can be aged to many temper conditions. For example, the process can naturally age the formed product to a T4 temper condition by air cooling, or artificially age the product to the T6 temper condition with solution heat treating and quenching. Heat treating the formed product to the T6 temper condition significantly increases the yield strength compared to the T4 condition. Therefore, the formed product is solution heat treated to multi-thickness complex shapes, yet may be produced from common shapes and thicknesses such as standard sheet stock. Furthermore, the formed product has a significant increase in yield strength and complex stiffening features, ribs, and attachment points, etc. Studies have shown that the total elongation of 5000 and 6000 series aluminum increases significantly at elevated temperatures. To elongate the blank at elevated temperatures the process may use lubricants that contain molybdenum disulfide, boron nitride, or colloidal graphite. It will be appreciated that other metals may be used for the blank, such as hardenable magnesium alloys.

Therefore, the process of the present invention may include heating the blank and die forming shell; positioning the blank into the die forming shell, for example, with the robotic arm; forming the blank into the formed product, including further heating the die forming shell inner surface and blank to the molding temperature and molding the stiffening features into the formed product; rapidly quenching the formed product; and separating the portions of the die forming shell and removing the formed product.

The heated stamping increases the material's total strain (depending on the alloy and strain rate), thus allowing greater design freedom. Stamping and forming allows the blank made of simple sheet stock to be formed into the formed product to achieve desirable material characteristics, such as bending stiffness. Furthermore, quenching from the solution heat treatment temperature enables the formed product to be heat treated to the T6 temper condition. The T6 material has a significantly higher yield strength compared to a material treated to T4 or T5 temper conditions as a conventional warm forming process. Additionally, the stronger T6 treatment allows more lightweighting opportunities and more consistent material properties. Each benefit represents a cost savings to the OEMs in terms of increased design flexibility, reduced uncertainty, and decreased material usage. Therefore, the present invention provides a stamping, forming, and quenching process that forms lightweight, enhanced strength components.

The system or process or method of the present invention may utilize aspects of the systems described in U.S. Pat. No. 8,479,552 and/or U.S. patent application Ser. No. 12/124,354, filed May 21, 2008, and/or Ser. No. 13/111,399, filed May 19, 2011, and/or Ser. No. 13/899,953, filed May 22, 2013 and published Nov. 28, 2013 as U.S. Publication No. US-2013-0312474, which are all hereby incorporated herein by reference in their entireties.

Changes and modifications to the specifically described embodiments may be carried out without departing from the principals of the present invention, which is intended to be limited only by the scope of the appended claims as interpreted according to the principles of patent law including the doctrine of equivalents.

The invention claimed is:

1. A method of forming and quenching a formed product, comprising:
   providing a tool having a die forming shell for supporting a blank, said die forming shell having a tool surface that defines a final shape of said formed product, said die forming shell manufactured from a metallic material;
   providing a blank at said die forming shell;
   supporting said die forming shell via a support structure;
   substantially joining two portions of said die forming shell;
   heating said tool surface and said blank while said die forming shell is supported via said support structure;
   forming said blank into said formed product; and
   conductively quenching said formed product through said die forming shell by use of a fluid.

2. The method of claim 1, wherein forming said blank into said formed product further comprises at least one of (a) heating said blank before said formed product is formed and (b) heating said blank during forming said formed product.

3. The method of claim 2, wherein heating said blank is conducted by an induction heating system.

4. The method of claim 3, wherein said induction heating system comprises at least one induction heating coil.

5. The method of claim 3, wherein said induction heating system heats at least a portion of said die forming shell.

6. The method of claim 3, wherein at least a portion of said blank is heated by said induction heating system.

7. The method of claim 3, wherein heating further comprises electrically heating at least a portion of said die forming shell and at least a portion of said blank by said induction heating system.

8. The method of claim 3, wherein heating further comprises electrically heating at least a portion of said die forming shell and at least a portion of said blank by conductive heating from said die forming shell.

9. The method of claim 3, wherein heating further comprises electrically heating at least a portion of said die forming shell by said induction heating and at least a portion of said blank by said induction heating system and conductive heating from said die forming shell.

10. The method of claim 3, wherein a DC magnetic field at least partially permeates said blank to affect formability of said blank.

11. The method of claim 10, wherein a second DC magnetic field at least partially permeates said blank to affect formability of said blank.

12. The method of claim 1, wherein heating said tool surface comprises heating at least a portion of one half of said tool surface.

13. The method of claim 12, wherein heating said at least portion of one half of said tool surface comprises electrically heating all of said tool surface of one half of said tool surface by resistance heating.

14. The method of claim 1, wherein heating comprises electrically heating by at least one of resistance heating and induction heating, wherein at least one induction heating coil at least partially heats said blank by induction heating and at least a portion of one said portion of said die forming shell by resistance heating.

15. The method of claim 1, wherein heating comprises heating by directly burning fossil fuels.

16. The method of claim 1, wherein said blank comprises a plastic material comprising at least one of (i) a thermoset and (ii) a thermoplastic material.

17. The method of claim 1, wherein said blank comprises a metallic material comprising at least one of (i) aluminum, (ii) magnesium, (iii) titanium, and (iv) steel.

18. The method of claim 1, wherein said support structure is integrated with said die forming shell.

19. The method of claim 1, wherein said support structure is made from a ceramic material.

20. The method of claim 1, wherein said support structure is made of more than one metallic material.

21. The method of claim 1, wherein said support structure is made of metallic and ceramic materials.

22. The method of claim 1, wherein said support structure comprises segmented sections separated by at least one of air and electrically insulating materials.

23. The method of claim 1, further comprising selectively heating and selectively cooling at least one portion of said blank to alter the material properties of the at least one portion of the blank while not substantially heating and cooling at least one other portion of the blank to achieve a targeted material composition of said at least one portion of the blank.

24. The method of claim 1, wherein said blank comprises a tubular member.

25. The method of claim 24, wherein said tubular member is gas formed.

26. The method of claim 24, wherein said tubular member is preheated.

27. The method of claim 26, wherein the fluid is preheated.

28. The method of claim 1, wherein a DC magnetic field at least partially permeates said blank to affect formability of said blank.

29. The method of claim 28, wherein said DC magnetic field is repeatedly turned on and off.

30. The method of claim 1, wherein heating comprises heating via an AC magnetic field at least partially permeating said blank to affect formability of the blank.

31. The method of claim 30, wherein said AC magnetic field is operated at a frequency less than approximately 500 KHz.

\* \* \* \* \*